United States Patent
Zhang et al.

(10) Patent No.: US 12,399,121 B2
(45) Date of Patent: Aug. 26, 2025

(54) METHOD AND APPARATUS FOR CHARACTERISING AN OBJECT

(71) Applicant: SOUTHERN UNIVERSITY OF SCIENCE AND TECHNOLOGY, Guangdong (CN)

(72) Inventors: Fucai Zhang, Guangdong (CN); Bingyang Wang, Guangdong (CN)

(73) Assignee: SOUTHERN UNIVERSITY OF SCIENCE AND TECHNOLOGY, Guangdong (CN)

( * ) Notice: Subject to any disclaimer, the term of this patent is extended or adjusted under 35 U.S.C. 154(b) by 208 days.

(21) Appl. No.: 18/274,629

(22) PCT Filed: Feb. 4, 2021

(86) PCT No.: PCT/CN2021/075154
§ 371 (c)(1),
(2) Date: Jul. 27, 2023

(87) PCT Pub. No.: WO2022/088547
PCT Pub. Date: May 5, 2022

(65) Prior Publication Data
US 2024/0094123 A1    Mar. 21, 2024

(51) Int. Cl.
*G01N 21/47* (2006.01)
(52) U.S. Cl.
CPC ................ *G01N 21/4788* (2013.01)
(58) Field of Classification Search
CPC .............. G01N 15/1434; G01N 21/4788
See application file for complete search history.

(56) References Cited

U.S. PATENT DOCUMENTS

| | | | |
|---|---|---|---|
| 2010/0241396 A1* | 9/2010 | Rodenburg | G01N 21/4788 |
| | | | 702/167 |
| 2019/0323959 A1 | 10/2019 | Schultz et al. | |
| 2019/0339199 A1 | 11/2019 | Schultz et al. | |

FOREIGN PATENT DOCUMENTS

| | | |
|---|---|---|
| CN | 107479103 A | 12/2017 |
| EP | 2478407 A1 | 7/2012 |

(Continued)

OTHER PUBLICATIONS

Wang, B. et al. "Modulator refinement algorithm for coherent modulation imaging", Ultramicroscopy 216 (2020) 113034, May 29, 2020.

(Continued)

*Primary Examiner* — Hina F Ayub
(74) *Attorney, Agent, or Firm* — CANTOR COLBURN LLP

(57) ABSTRACT

A method for characterising an object, including: providing, via a support plane, coherent incident radiation at the object at each of a plurality of radiation configurations, detecting, at a detector, an intensity of radiation scattered by the object for each radiation configuration, and determining, via an iterative process, an object transmission function associated with the object in dependence on the detected intensity of radiation for each radiation configuration. The iterative process comprises estimating, for each radiation configuration, an entrance wave function and an exit wave function, a support constraint and a current estimate of the object transmission function, determining a ratio of a sum of intensities of the exit wave function for the plurality of radiation configurations to a sum of intensities of the entrance wave function therefor, and updating the estimate of the object transmission function in dependence on the determined ratio and an amplitude constraint.

20 Claims, 6 Drawing Sheets

(56) References Cited

FOREIGN PATENT DOCUMENTS

WO 2011033287 A1 3/2011
WO 2020057924 A1 3/2020

OTHER PUBLICATIONS

Marchesini, S. "A unified evaluation of iterative projection algorithms for phase retrieval", Rev. Sci. Instrum. 78 (1) (2007), 11 pages.
Pfeiffer, F. "X-ray ptychography", Nat. Photon 12 (1) (2018) 9-17.
International Search Report dated Nov. 3, 2021; International Application No. PCT/CN2021/075154; 4 pages.
Written Opinion dated Nov. 3, 2021; International Application No. PCT/CN2021/075154; 4 pages.

\* cited by examiner

METHOD AND APPARATUS FOR CHARACTERISING AN OBJECT

CROSS REFERENCE TO RELATED APPLICATIONS

This application is a National Stage of PCT Application No. PCT/CN2021/075154 filed on Feb. 4, 2021, the contents of which is incorporated herein by reference thereto.

TECHNICAL FIELD

This invention relates to a method and apparatus for characterising an object. In particular, the invention relates to characterising an object using coherent imaging.

BACKGROUND

Coherent Diffraction Imaging (CDI) is a lensless coherent imaging technique widely applicable to fields such as biology and materials science. An object may be imaged using CDI by determining a complex exit wave of the object directly from a recorded diffraction intensity measurement. In CDI, retrieving a phase of the exit wave is non-trivial and conventional techniques are limited in robustness, necessitating isolated samples and simple phase variation. Conventional CDI techniques are exemplified by S. Marchesini, "A unified evaluation of iterative projection algorithms for phase retrieval", Rev. Sci. Instrum. 78 (1) (2007) 011301.

The performance of CDI has been improved by Ptychography, such as described in F. Pfeiffer, "X-ray ptychography", Nat. Photon 12 (1) (2018) 9-17. Ptychography provides better algorithmic convergence through recording multiple diffraction patterns each arising from a positional change of incident radiation with respect to the object with an overlapped illumination region between some measurements and utilising the overlapped regions as a constraint. However, the multiple overlapping measurements impose a requirement on the stability of the setup which is not always practicable. For example, in experimental situations using x-rays or electrons or situations with fast sample dynamics, the stability necessary for ptychography is not available. Furthermore, in ptychography the function of the incident radiation must remain constant through the positional shifts. This may impact the lateral resolution and sectioning capability of the imaging.

An alternative improvement to CDI is offered by Coherent Modulation Imaging (CMI), such as described in published application EP2478407A1. CMI is a "single shot" technique in which only one illumination of the object is utilized and wherein a modulator is placed between the object and the detector to strengthen interference among wavelets of the object exit wave and facilitate the phase retrieval. However, in CMI it is key that a modulator function associated with the modulator is known as a prior parameter. The acquisition or refinement of the modulator function to the required degree necessitates secondary measurement techniques, such as ptychography, to be implemented in order to characterise the modulator.

It has been shown that as an alternative to ptychography to characterise the modulator, multiple independent CMI measurements may be averaged during CMI ("*Modulator refinement algorithm for coherent modulation imaging*", Wang et al., Ultramicroscopy 216 (2020) 113034, 29 May 2020). This averaging enables refinement of the modulator function without necessitating separate experimental characterisation of the modulator. However, such a technique is only suitable for refinement, i.e. the modulator function needs to already be known with reasonable accuracy.

It is an aim of the present invention to mitigate one or more of the problems with the prior art.

BRIEF SUMMARY OF THE DISCLOSURE

In accordance with the present invention there is provided a method for characterising an object, an apparatus and a computer-readable medium.

According to a first aspect there is provided a method for characterising at least a portion of an object, comprising the steps of: providing, via a support plane, coherent incident radiation at the object at each of a plurality of radiation configurations; detecting, at a detector, an intensity of radiation scattered by the object for each of the plurality of radiation configurations; and determining, via an iterative process, an object transmission function associated with the object in dependence on the detected intensity of radiation at the detector for each of the plurality of radiation configurations.

The iterative process comprises: estimating, for each of the plurality of radiation configurations, an entrance wave function indicative of the incident radiation at the object and an exit wave function indicative of radiation emitted from the object in dependence on the detected intensity at the detector, a support constraint at the support plane and a current estimate of the object transmission function; determining a ratio of a sum of intensities of the exit wave function for the plurality of radiation configurations to a sum of intensities of the entrance wave function for the plurality of radiation configurations; and updating the estimate of the object transmission function in dependence on the determined ratio and an amplitude constraint. That is, the determined ratio is constrained by the amplitude constraint to obtain the object transmission function.

Determination of the ratio defines an averaging operation over the independent measurements taken for the different radiation configurations. Advantageously, constraining the ratio with an amplitude constraint enables the iterative process to converge for a completely unknown object.

The estimate of each wave function may be iteratively updated. In each iteration of the process, each of the entrance wave function, exit wave function and object transmission function may be updated. In particular, each estimate may be updated in dependence on the estimates made in the previous iteration. An estimate of an illumination wave function at the support plane is also iteratively updated for each radiation configuration.

The estimates of the entrance wave function and the exit wave function for a given radiation configuration are estimated in dependence on the detected intensity at the detector for that respective radiation configuration.

Optionally, the amplitude constraint comprises a minimum amplitude limit and a maximum amplitude limit for the object transmission function. The minimum amplitude limit and the maximum amplitude limit may be predetermined to exclude physically impossible values. In some embodiments, the amplitude constraint comprises the condition $|O| \in [0,1]$, wherein $|O|$ denotes the amplitude of the estimate of the object transmission function.

At each iteration, determining the ratio may comprise determining the sum of intensities of the entrance wave function as estimated in the current iteration; and determining the sum of intensities of the exit wave function as estimated in the previous iteration. That is, the ratio may be determined to reflect the updated entrance wave function. For example, at each iteration n the ratio may determined in dependence on a parameter:

$$\frac{\sum_{j=1}^{N} E_{j,n-1} \cdot P_{j,n}^*}{\sum_{j=1}^{N} P_{j,n} \cdot P_{j,n}^*}$$

wherein $E_{j,n-1}$ denotes the exit wave function for radiation configuration j at iteration n−1, and $P_{j,n}$ denotes the entrance wave function for radiation configuration j at iteration n. The determined ratio may then be constrained by the amplitude constraint to obtain the updated object transmission function.

At each iteration, determining the ratio may comprise determining the sum of intensities of the entrance wave function as estimated in the previous iteration; and determining the sum of intensities of the exit wave function as estimated in the current iteration. That is, the ratio may be determined to reflect the updated exit wave function. At each iteration n the ratio is determined in dependence on a parameter:

$$\frac{\sum_{j=1}^{N} E_{j,n} \cdot P_{j,n-1}^*}{\sum_{j=1}^{N} P_{j,n-1} \cdot P_{j,n-1}^*}$$

wherein $E_{j,n}$ denotes the exit wave function for radiation configuration j at iteration n, and $P_{j,n-1}$ denotes the entrance wave function for radiation configuration j at iteration n−1. The determined ratio may then be constrained by the amplitude constraint to obtain the updated object transmission function.

At each iteration, the object transmission function may be updated once or more than once. In particular, in some embodiments the object transmission function may be updated a first time to reflect the updated entrance wave function, and a second time to reflect the updated exit wave function.

The iterative process may comprise: providing an initial estimate of the object transmission function; providing an initial estimate of a wave function associated with each radiation configuration at the support plane; and propagating the wave function to and fro between the support plane and the detector to obtain the estimate for the entrance wave function and the estimate for the exit wave function.

Optionally, the plurality of radiation configurations comprise: a plurality of tilt angles of the incident radiation; or a plurality of rotation angles of a phase screen at the support plane.

The method may comprise terminating the iterative process in dependence on a convergence of the object transmission function between subsequent iterations.

The method may comprise determining image data indicative of the object in dependence on the object transmission function.

According to a second aspect, there is provided a method for characterising at least a portion of an object, comprising the steps of: providing, via a support plane, coherent incident radiation at the object at each of a plurality of radiation configurations, wherein each radiation configuration comprises a predetermined tilt angle of the incident radiation; detecting, at a detector, an intensity of radiation scattered by the object for each of the plurality of radiation configurations; and determining, via an iterative process, an object transmission function associated with the object in dependence on the detected intensity of radiation at the detector for each of the plurality of radiation configurations.

The iterative process comprises estimating, for each of the plurality of radiation configurations, an entrance wave function indicative of the incident radiation at the object and an exit wave function indicative of radiation emitted from the object in dependence on the predetermined tilt angle for the radiation configuration, the detected intensity at the detector, a support constraint at the support plane and a current estimate of the object transmission function; determining a ratio of a sum of intensities of the exit wave function for the plurality of radiation configurations to a sum of intensities of the entrance wave function for the plurality of radiation configurations; and updating the estimate of the object transmission function in dependence on the determined ratio.

According to a further aspect there is provided an apparatus for characterising an object. The apparatus comprises one or more electronic processors configured to operatively execute computer-readable instructions to perform a method according to any of the above aspects.

Optionally, the apparatus further comprises a radiation source configured to provide the coherent incident radiation; and a detector configured to detect an intensity of radiation scattered by the object for each of the plurality of radiation configurations and output the detection data in dependence thereon.

According to a further aspect, there is provided a computer-readable medium comprising computer software which, when executed, is arranged to perform a method according to the above aspects.

BRIEF DESCRIPTION OF THE DRAWINGS

Embodiments of the invention are further described hereinafter with reference to the accompanying drawings, in which.

DETAILED DESCRIPTION

Prior art coherent imaging techniques suffer from a number of drawbacks. Non-triviality of phase retrieval means that conventional CDI may lack robustness and may only be suitable for objects with simple phase variation. Ptychography provides a more robust imaging technique, however is not suitable for unstable experimental setups or those with fast sample dynamics. Coherent Modulation Imaging (CMI) provides a single-shot imaging technique, however it requires at least a reasonably accurate prior knowledge of the modulator function for the modulator used.

An improved coherent imaging technique, referred to herein as multi complex illumination imaging, is provided which may be utilised to robustly characterise the complex exit wave of a completely unknown object. The disclosed technique may be used as a standalone imaging technique to image the object or may be used to characterise a completely unknown modulator for taking CMI measurements. Embodiments of the invention will be described with reference to multi complex illumination imaging as a standalone imaging technique, however it will be appreciated that the characterisation method may be utilised for other purposes, such as for characterising a modulator during a CMI measurement as mentioned.

The present imaging technique utilises incident radiation at a plurality of different radiation configurations, such as multi-angle planar light, to obtain a number of independent recorded diffraction patterns of the same object. Each radiation configuration may be characterised by a different illumination wavefield, which may be unknown. For each radiation configuration, by utilising a support constraint at a support plane through which the incident radiation is provided, and a constraint of each recorded diffraction pattern, an estimate of the wavefield exiting the unknown object may be obtained. The plurality of independent measurements may then be averaged to iteratively update an estimate of an object transmission function for the object. Beneficially, in some embodiments by introducing an amplitude constraint on the amplitude of the transmission function, iteratively updating the object transmission function in this way can be seen to converge for an unknown object. The convergence of the object transmission function may then allow the wavefield exiting the object i.e. the exit wave characterising the object to be reconstructed for each radiation configuration. The previously unknown illumination wavefield characterising each radiation configuration may also be retrieved.

In other embodiments, alternatively to a constraint on amplitude, known radiation or illumination configurations, such as known tilt angles for each configuration of the incident radiation may be utilised as an alternative constraint to facilitate convergence and reconstruct the wavefield exiting the object.

Figure 1:
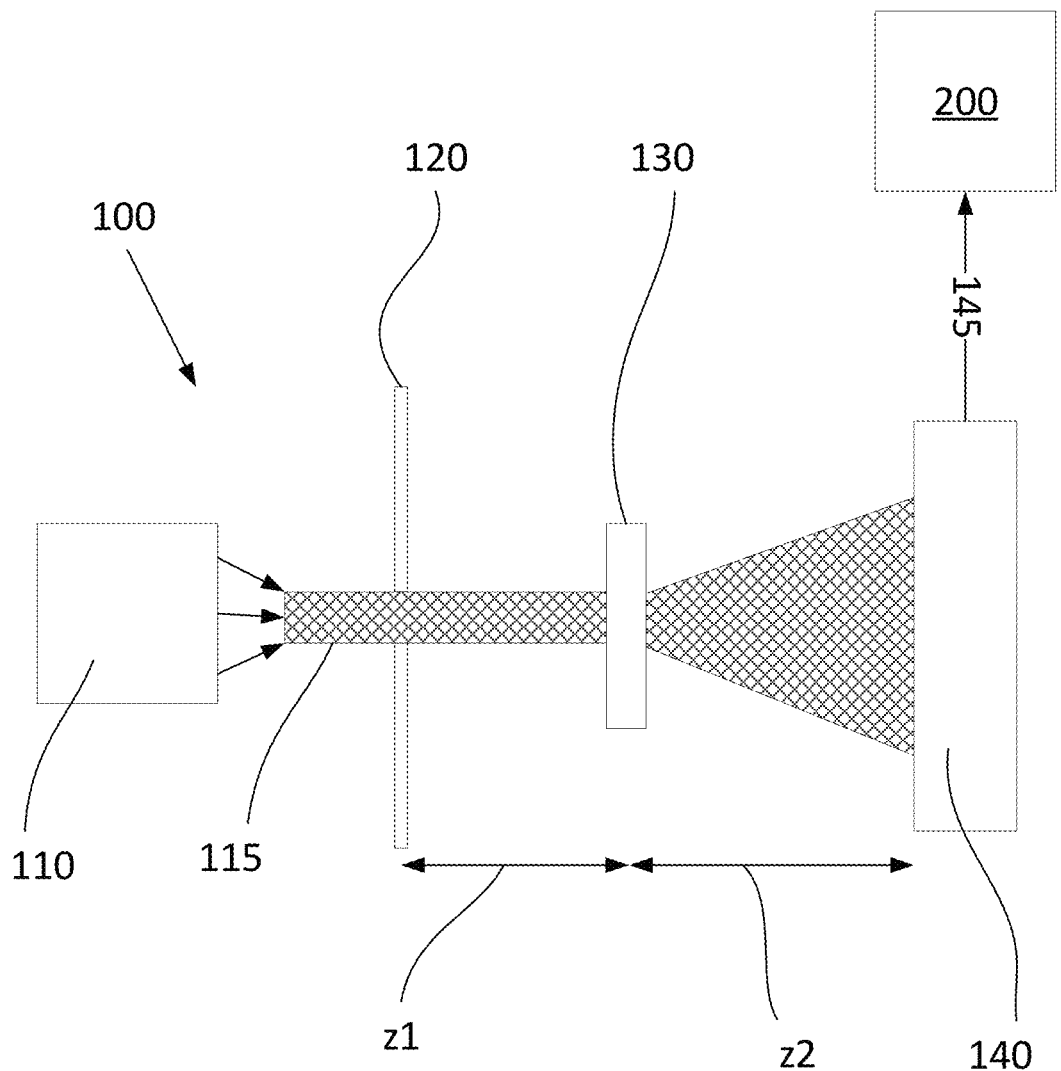
FIG. 1 shows an apparatus for performing coherent diffraction imaging (CDI) according to an embodiment.

FIG. 1 illustrates an apparatus 100 for characterising an unknown or partially unknown object 130 according to an embodiment of the present invention. The apparatus 100 is illustrated in a transmission arrangement where radiation is transmitted through the object 130. It will also be realised that the apparatus 100 may be arranged in a reflection configuration where the radiation reflects from the object 130.

The apparatus 100 comprises one or more radiation sources 110 configured to provide coherent incident radiations 115 directed to the object 130. The radiation source 110 in an illustrated embodiment may be a laser light source 110 for providing a coherent illumination wave 115, although it will be appreciated that the laser light source 110 may be readily substituted for a source of an alternative type of coherent radiation, such as X-ray, electron or other types of coherent radiation. The one or more radiation sources 110 are configured to provide incident radiation 115 at each of a plurality of different radiation configurations in order to facilitate the recording of independent diffraction measurements. That is, a diffraction pattern is recorded for each radiation configuration. The plurality of different radiation configurations may for example be different illumination angles, also herein referred to as illumination tilt angles. The illumination angle of a radiation configuration may be defined as an angle between an axis of the coherent incident radiation 115 and an optical axis of the apparatus 100. The optical axis of the apparatus 100 may be defined as normal to a sensing surface of the detector 140. In other embodiments, the radiation source 110 may provide illumination at a single angle. The plurality of radiation configurations may be provided by adjusting the illumination wave subsequently, for example by rotating a phase screen via which the incident illumination is provided to the object.

The incident radiation 115 is propagated from the radiation source 110 to a support plane 120 positioned between the radiation source 110 and the object 130 in the apparatus 100. The support plane 120 defines a plane of space through which the incident radiation 115 is propagated. A physical support, for example a sheet of material, is located at the support plane 120. The physical support may comprise an aperture 121 defining a support region through which the incident radiation propagates. The physical support may thus comprise a sheet of material through which the radiation does not substantially penetrate, expect for through the aperture 121. When performing the iterative process as will be described to estimate the wavefield at different locations of the apparatus 100, a support constraint $S(r_s)$ may thus be applied to the incident radiation at the support plane 120, denoted by $r_s$, such that $$S(r_s) = \{_0^1 r_s \in \text{support regions otherwise}$$

The apparatus 100 comprises a detector 140 for detecting an intensity of radiation scattered by the object 130 for each of the plurality of radiation configurations. The detector 140 is configured to record a diffraction pattern corresponding to each radiation configuration. The detector is configured to output detection data 145, in the form of one or more electrical signals, indicative of the recorded diffraction pattern to a computing device 200. The detector 140 may comprise a plurality of detector portions each arranged to output a value indicative of an intensity of radiation falling thereon. The detector 140 may be such as a CCD or the like for providing detection data 145 indicative of the diffraction pattern. The detection data may be communicated to the device 200 via an electrical connection. Alternatively, the detection data 145 may be stored on a data storage device such as a memory and communicated via the memory to the device 200 for subsequent use in a method according to an embodiment of the invention.

Figure 2:
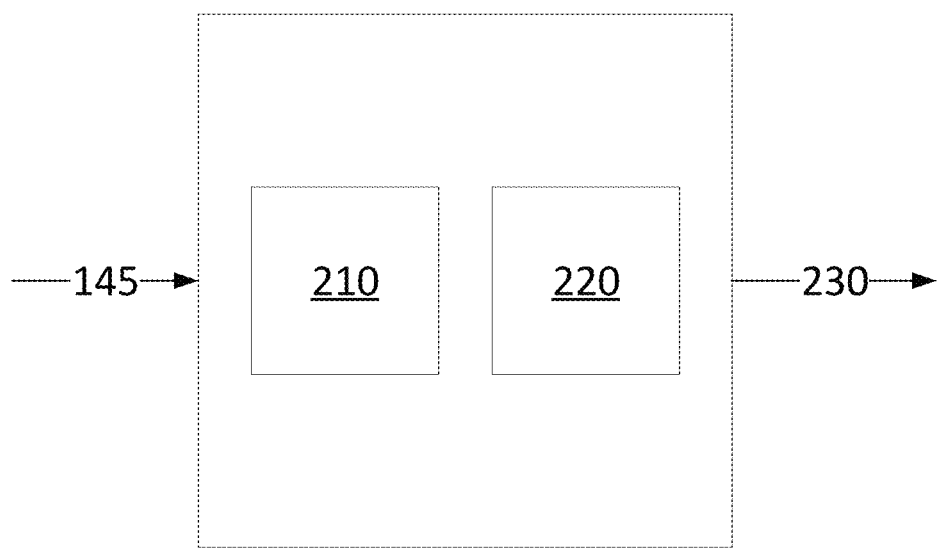
FIG. 2 is a schematic illustration of a computing device configured to perform a method according to an embodiment.

The computing device 200 is illustrated further in FIG. 2. The computing device 200 may be any suitable device with processing capabilities such as a personal computer, a server computer, or a mobile device such as a tablet, laptop or mobile phone. The computing device 200 comprises one or more processors 210 for executing computer-readable instructions and one or more memory devices 220 for storing data. The memory devices 220 may be configured to store the computer-readable instructions which, when executed by the one or more processors 210, cause the computing device 200 to perform one or more portions of a method for characterising the object 130 according to an embodiment of the invention, as will be described. The computing device is communicably coupled to the detector 140 such that the detector 140 may communicate the detection data 145 to the computing device 200. The communication may be wired, for example the computing device 200 may be electronically coupled to the detector 140, or wireless, such as via any suitable wireless communication technology such as Wi-Fi, Bluetooth, NFC and the like. In some embodiments each of the computing device 200 and the detector 140 may be connectable to one or more wired or wireless networks such as the Internet and may communicate via the one or more networks.

The detection data 145 is utilised to determine an object transmission function (or object function) characterising at least a portion of the object 130, as will be explained. The detection data 145 may also be used to retrieve an illumination wavefield associated with each radiation configuration, where the illumination wavefields are unknown or partially unknown. Optionally, the computing device may determine image data 230 associated with the object 130 in dependence on the determined object transmission function and each illumination wavefield.

Figure 3:
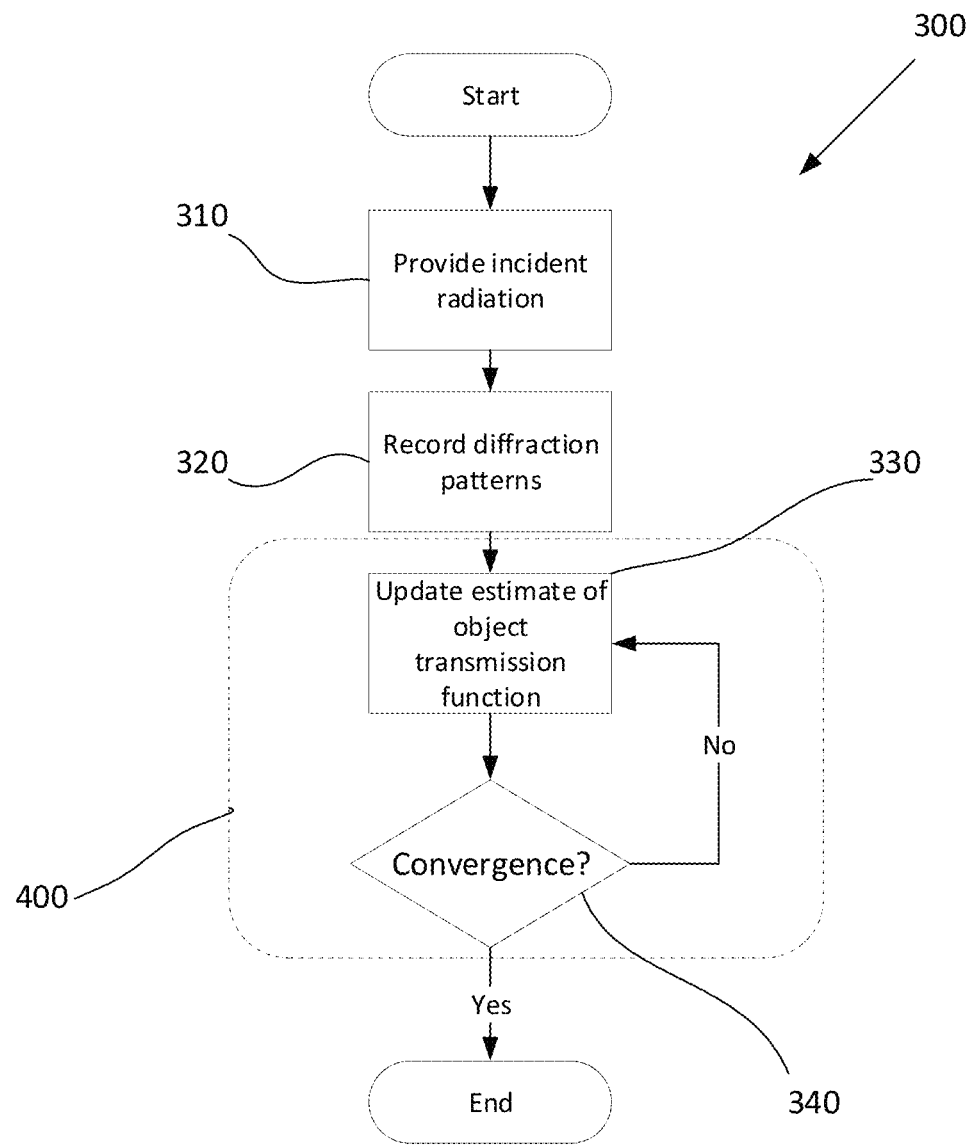
FIG. 3 is a flow chart of a method 300 for characterising an object according to an embodiment.

A method 300 according to an embodiment of the invention for characterising the object 130 is illustrated in FIG. 3. The method 300 may be performed by the processor 210 according to the computer-readable instructions.

The method 300 comprises a step 310 of providing coherent incident radiation to the object 130. The incident radiation is provided by the radiation source 110 via the support plane 120, as has been described. The coherent incident radiation is provided at each of a plurality of radiation configurations as discussed above. Each radiation configuration may be defined by a respective illumination wavefield, or support wavefield, at the support plane. In some embodiments, the radiation configurations, and thus the illumination wavefields, are at least partially unknown.

The method 300 comprises a step 320 of detecting, at the detector 140, an intensity of radiation scattered by the object for each of the plurality of radiation configurations. The detector 140 is configured to record detection data 145 representing a diffraction pattern for each of the radiation configurations and transmit the detection data 145 indicative of the collection of diffraction patterns to the computing device 200.

The method 300 comprises an iterative process 400 for determining an object transmission function associated with the object 400, which may be performed by the computing device 200. The detection data 145 and a number of further constraints may be utilised to iteratively update 330 an estimate of the object transmission function associated with the object 130. The computing device 200 may be configured to perform the iterative process 400 until one or more exit criteria are met. In some embodiments, the iterative process 400 concludes when it is determined in step 340 that the estimate of the object transmission function has converged, or when a suitable number of iterations of the process have been performed, such as 1000 or 2000 iterations (other numbers can be envisaged). It will be appreciated that alternative exit criteria may be used. For example, an error metric, such as a root mean square (RMS) may be defined between the measured diffraction intensity at the detector and an estimated diffraction intensity in the iterative process. The exit criteria may be determined to be met when the error metric is below a threshold.

An embodiment of the iterative process 400 will be described in further detail with reference to FIG. 4.

Figure 4:
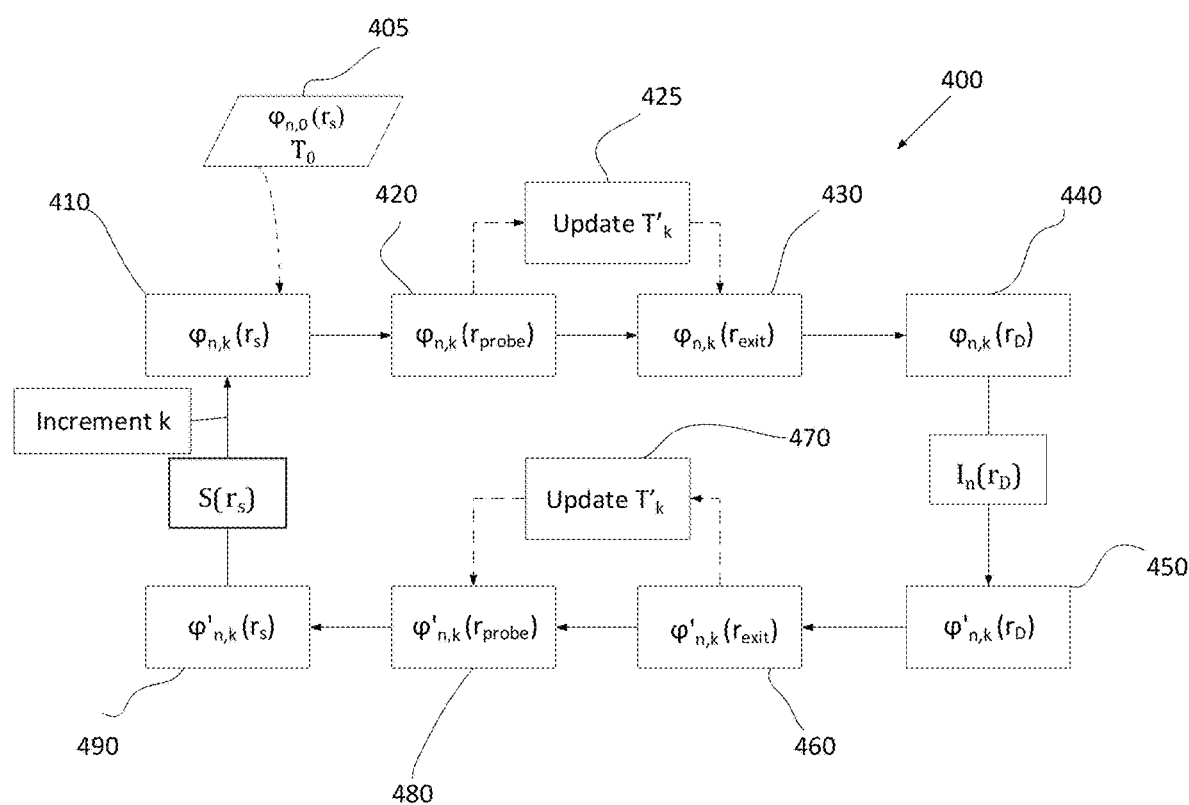
FIG. 4 illustrates an iterative process performed during an embodiment of the method 300.

FIG. 4 illustrates a single iteration k of the iterative process 400.

At the first iteration, the process 400 is initialised 405 with initial estimations of the incident illumination wave 115 at the support plane 120 $\varphi_{n,0}(r_s)$ for each radiation configuration n, and an initial estimation of the object transmission function $T_0$. Here 0 denotes the $0^{th}$ iteration of the process 400, and n denotes the nth radiation configuration, n=1, 2, ..., N where there are N radiation configurations in total. In the illustrated embodiment, the N radiation configurations comprise N different illumination tilt angles. In some embodiments, it not necessary to know the tilt angle of each configuration. In other embodiments, knowledge of the tilt angle for each configuration is utilised as discussed below. In the initialisation 405 one or more further a priori known facts may be utilised to improve or inform the initial estimates. For example, it may be known that the N illumination angles increase with increased n and this may be utilised to inform the initial estimates of each wavefield at the support plane $\varphi_{n,0}(r_s)$. In some embodiments, the N different radiation configurations may be formed by applying different modulations onto the incident radiation provided by the radiation source 110.

In step 410, the estimation of each illumination wave at the support plane $\varphi_{n,k}(r_s)$ is updated in dependence on the support constraint. Step 410 comprises in some embodiments driving all values of the wavefield outside the support region to zero, as follows:

$$\varphi_{n,k}(r_s) = \varphi'_{n,k-1}(r_S) \cdot S(r_s) + \beta\left(\varphi'_{n,k-1}(r_S) - \varphi_{n,k-1}(r_s)\right) \cdot (1 - S(r_s))$$

$$S(r_s) = \begin{cases} 1 & r_s \in \text{support regions} \\ 0 & \text{otherwise} \end{cases}$$

In the above equation, $\varphi_{n,k}(r_s)$ is the current estimate of the wavefield at the support plane 120, i.e. support wavefield, $\varphi_{n,k}(r_s)$ denotes the estimate of the support wavefield from the previous iteration k−1, and $\varphi'_{n,k}(r_s)$ denotes the revised support wavefield from the previous iteration k−1 after propagating to a plane of the detector 140 and back, as will be explained. The parameter β is defined as the feedback strength and is a predetermined constant throughout the method which defines how quickly the method converges. In this instance, β defines how strongly the wavefield outside the support is driven to zero. In an illustrative example, a value β=0.5 is used, however it will be appreciated that other values would also work, such not exclusively as 0.4 or 0.6.

In step 420, each support wavefield $\varphi_{n,k}(r_s)$, n=1, ..., N is propagated to the front or entrance surface of the object 140 to determine an estimate of a respective entrance, or probe, wavefield $\varphi_{n,k}(r_{probe})$ for the given radiation configuration n. The entrance wavefield provides an estimate of the wavefield incident on the object 140. The propagation of step 420 to determine the entrance wavefield may be denoted:

$$\varphi_{n,k}(r_{probe}) = P_{z1}\{\varphi_{n,k}(r_s)\}$$

$P_{z1}$ represents the propagation from the support plane 120 to the object 130 across the distance z1 as illustrated in FIG. 1. A suitable propagation operator may be selected in dependence on the distance z1 and the properties of the support wavefield $\varphi_{n,k}(r_s)$, as will be appreciated. As an illustrative example, for near-field propagation the angular spectrum method may be utilised for the propagation. For intermediate-range propagation, a Fresnel propagator may be utilised. For far field geometry, other propagation operators may be used, such as Fourier transform.

In step 425, the estimate of the object transmission function $T_k$ may be updated to reflect the updated estimate of the entrance wavefield determined in step 420. The nature of the updating exploits the provision of the N independent measurements and thus N independent revisions of the entrance wavefield as determined in the preceding propagation steps. An accumulation across the N measurements of the wavefields of the estimated exit waves emitted from the object 140, as determined in the preceding iteration, is determined. An accumulation across the N measurements of the wavefields of the entrance waves as updated in step 420, is determined. An averaging operation is performed by calculating a ratio of these accumulations. Such an averaging operation facilitates a refinement of the object transmission function. In some embodiments, when this refinement is further constrained in amplitude, an updated object transmission function may be determined which advantageously converges over the k=1, . . . , K iterations.

The averaging operation performed in step 425 may be defined as follows:

$$T'_k = \frac{\sum_{n=1}^{N} \varphi_{n,k-1}(r_{exit}) \cdot \varphi^*_{n,k}(r_{probe})}{\sum_{n=1}^{N} \varphi_{n,k}(r_{probe}) \cdot \varphi^*_{n,k}(r_{probe})}$$

In the above notation, the superscript * denotes complex conjugation. The summation is across the estimated entrance and exit wavefields of the N radiation configurations. In this embodiment, the estimate of the exit wavefield from the previous (k−1) iteration is utilised in conjunction with the updated estimate of the entrance wavefield as updated in step 420.

An amplitude constraint is applied to the result of the averaging operation to determine the updated object transmission function $T'_k$. A general amplitude constraint may be utilised, i.e. $|T_k'| \in [c_{min}, c_{max}]$, $c_{min}=0$, $c_{max}=1$. The implementation of the amplitude constraint to determine the updated object transmission function $|T_k'|$ may be as follows:

$$T'_k = \frac{c_{max} \cdot T'_k}{|T'_k|+\epsilon}, \quad |T'_k| > c_{max}$$

$$T'_k = \frac{c_{min} \cdot T'_k}{|T'_k|+\epsilon}, \quad |T'_k| < c_{min}$$

In step 430, the current estimate of the object transmission function is applied to propagate each entrance wavefield through the object and determine an estimate $\varphi_{n,k}(r_{exit})$ of each exit wavefield emitted from the object. If the object transmission function has been updated in step 420, the updated object transmission function may be used. The object transmission function may be applied by multiplying the respective entrance wavefield $$\varphi_{n,k}(r_{exit})=\varphi_{n,k}(r_{probe}) \cdot T_k$$

In the first iteration of the process 400, the initial estimate $T_0$ is utilised as the object transmission function.

In step 440, each exit wavefield is propagated across the distance z2 to the detector 140 to determine an estimate of the detector wavefield $\varphi_{n,k}(r_D)$ incident on the detector 140 for each radiation configuration n. Two different propagations may be utilised.

In some iterations, the propagation of step 440 to determine the detector wavefield may be denoted using a first propagation formula:

$$\varphi_{n,k}(r_D)=P_{z2}\{2\varphi_{n,k}(r_{exit})-\varphi_{n,k-1}(r_{exit})\}$$

Where $P_{z2}$ represents the propagation from the object to the detector across the distance z2 as illustrated in FIG. 1. A suitable propagation operator may be selected in dependence on the distance z2, as will be appreciated. As an illustrative example, for near-field propagation the angular spectrum method may be utilised for the propagation. For intermediate-range propagation, a Fresnel propagator may be utilised. For far field geometry, a Fourier propagator may also be used.

Beneficially, utilising both the current estimate and the previous estimate of the exit wavefield in the above propagation aids in avoiding stagnation of the iterative process. In particular, it may help the iterative calculation get out of local minimums.

In some iterations, a second propagation formula may alternatively be used in order to help prevent divergence of the iterative process. The second propagation formula may for example be:

$$\varphi_{n,k}(r_D)=P_{z2}\{\varphi_{n,k}(r_{exit})\}$$

It will be appreciated that in some embodiments, the same propagation formula may be used in every iteration of step 440. In other embodiments, the formula used in step 440 may alternate in dependence on the iteration k. For example, the first formula may be used initially, and the second formula may be used periodically, i.e. every predetermined number of iterations. In one embodiment, the second formula may be used every 5 iterations, but it will be appreciated that the predetermined number of iterations may vary.

In step 450, an updated estimate $\varphi'_{n,k}(r_D)$ of the detector wavefield is determined using the known recorded diffraction pattern $I_n(r_D)$ as a constraint on the intensity of the detector wavefield. The update may be performed in an embodiment as:

$$\varphi'_{n,k}(r_D) = \frac{\sqrt{I_n(r_D)}}{|\varphi_{n,k}(r_D)|+\epsilon}\varphi_{n,k}(r_D)$$

$I_n(r_D)$ denotes the detected intensity of the wavefield at the detector plane $r_D$.

The updated detector wavefield is then back propagated to the object in step 460 using the inverse of the propagation operator of step 440 to obtain an updated exit wavefield:

$$\varphi'_{n,k}(r_{exit})=P_{z2}^{-1}\{\varphi'_{n,k}(r_D)\}-\varphi_{n,k}(r_{exit})+\varphi_{n,k-1}(r_{exit})$$

In step 470, the estimate of the object transmission function $T_k$ may be updated to reflect the updated exit wavefield $\varphi'_{n,k}(r_{exit})$. As with step 425, the nature of the updating exploits the provision of the N independent measurements and thus N independent revisions of the entrance wavefield and exit wavefield as determined in the preceding propagation steps. By determining a ratio through dividing an accumulation of the wavefields of the estimated exit waves emitted from the object 140 to an accumulation of the wavefields of the estimated entrance waves incident on the object 140, such an averaging operation facilitates a refinement of the object transmission function. In some embodiments, when this refinement is further constrained in amplitude, an updated object transmission function may be determined which advantageously converges over the k=1, . . . , K iterations.

The averaging operation of step 470 may be defined as follows:

$$T'_k = \frac{\sum_{n=1}^{N} \varphi'_{n,k}(r_{exit}) \cdot \varphi^*_{n,k}(r_{probe})}{\sum_{n=1}^{N} \varphi_{n,k}(r_{probe}) \cdot \varphi^*_{n,k}(r_{probe})}$$

In step 470, the updated estimate of each exit wavefield is utilised in conjunction with the estimate of the entrance wavefield prior to propagating to and from the detector plane.

As with step 425, an amplitude constraint is applied to the result of the averaging operation to determine the updated object transmission function $T'_k$. A general amplitude constraint may be utilised, i.e. $|T'_k| \in [c_{min}, c_{max}]$, $c_{min}=0$, $c_{max}=1$. The implementation of the amplitude constraint to determine the updated object transmission function ITkI may be as follows:

$$T'_k = \frac{c_{max} \cdot T'_k}{|T'_k|+\epsilon}, \ |T'_k| > c_{max}$$

$$T'_k = \frac{c_{min} \cdot T'_k}{|T'_k|+\epsilon}, \ |T'_k| < c_{min}$$

In some embodiments of the invention, only one of steps 425 and steps 470 is performed at each iteration, thereby only updating the object transmission function once in each iteration k. In other embodiments, both step 425 and 470 may be performed, enabling the object transmission function to be updated twice in each iteration. In this way, the object transmission function may be updated prior to each time it is used to propagate the wavefield through the object.

In an alternative embodiment of steps 425 and/or 470, an amplitude constraint may not be necessary when updating the object transmission function. In this case, an alternative constraint is utilised in the iterative process to aid in obtaining convergence in the method. In one embodiment, this alternative constraint may be provided by utilising known, or almost-known illumination tilt angles at the wavefield in the source plane. In this way, the initial estimates of the source wavefield are close to accurate.

In step 480, an updated entrance wavefield $\varphi'_{n,k}(r_{probe})$ for each radiation configuration n is determined by propagating each exit wavefield $\varphi'_{n,k}(r_{exit})$ back through the object. This may be calculated using the updated object transmission function $T'_k$. The updated entrance wavefield may be determined as:

$$\varphi'_{n,k}(r_{probe}) = \varphi_{n,k}(r_{probe}) + \frac{aT'_k}{|T'_k|^2_{max}} \cdot (\varphi'_{n,k}(r_{exit}) - \varphi_{n,k}(r_{exit}))$$

In the above equation, a is a predefined constant. It has been found that α may be predefined in the range of [0.1, 1.5] to provide improved algorithmic convergence. For example, a may be predefined as 0.6 in one embodiment. It will be appreciated that other values, e.g. 0.7, 0.5 may be utilised.

Finally, in step 490, a revised wavefield at the support plane $\varphi'_{n,k}(r_s)$ is determined by back-propagating $\varphi'_{n,k}(r_{probe})$ from the object to the support plane across the distance z1. This back propagation may be defined as the inverse of the propagation operation used in step 420 as follows:

$$\varphi'_{n,k}(r_s) = P_{z1}^{-1}\{\varphi'_{n,k}r_{probe})\}$$

At this point in the process 400, the estimated wavefield at each location for each radiation configuration has been updated in dependence on the provided constraints at the support plane 120 and the detector 140, and the object transmission function has been updated at least once by averaging over the different independent estimates and applying an amplitude constraint. At this point, k is incremented and the process returns to step 410 to update the support wavefield at the support plane 120 in dependence on the support constraint. Furthermore, the updated object transmission function from the completed iteration $T'_{k-1}$ is set to define $T_k$.

The process 400 proceeds to iterate and increment k until one or more predetermined exit conditions are met in step 340. In particular, it may be determined whether the object transmission function $T_k$ has converged, i.e. whether a difference between $T_{k-1}$ and $T_k$ is less than a threshold. When the condition is met, the iterative process 400 will terminate and the most recent object transmission function $T_k$ will be returned as a result. In other embodiments, a number of the current iteration may be compared against a predetermined iteration number to determine whether sufficient iterations have been performed. In further embodiments, it may be determined whether an error metric between each estimated intensity of the detector wavefield and each known recorded diffraction pattern $I_n(r_D)$ is less than a threshold. For example, the root mean square (rms) may be used as an appropriate error metric.

The computing device 200 may determine image data 230 indicative of the object in dependence on the returned object transmission function.

Figure 5:
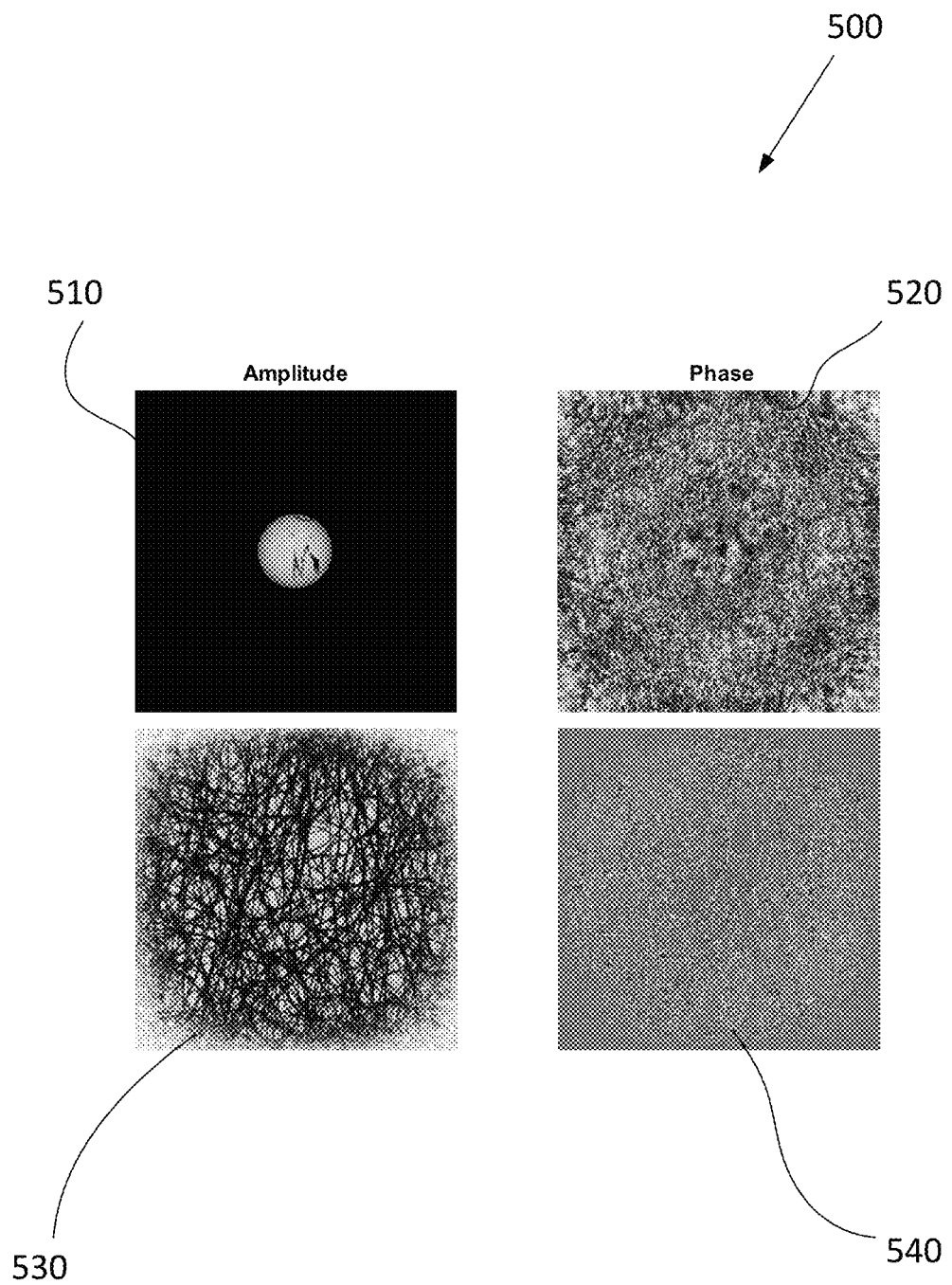
FIG. 5 illustrates example image data constructed following performance of the method 300.

Example image data 500 determined following performance of the claimed method is shown in FIG. 5. The image data 500 comprises an image 510 indicative of an amplitude reconstruction of an illumination wave at the support plane, an image 520 indicative of a phase reconstruction of the illumination wave at the support plane, an image 530 indicative of an amplitude reconstruction of the imaged object, and an image 540 indicative of a phase reconstruction of the imaged object.

Figure 6:
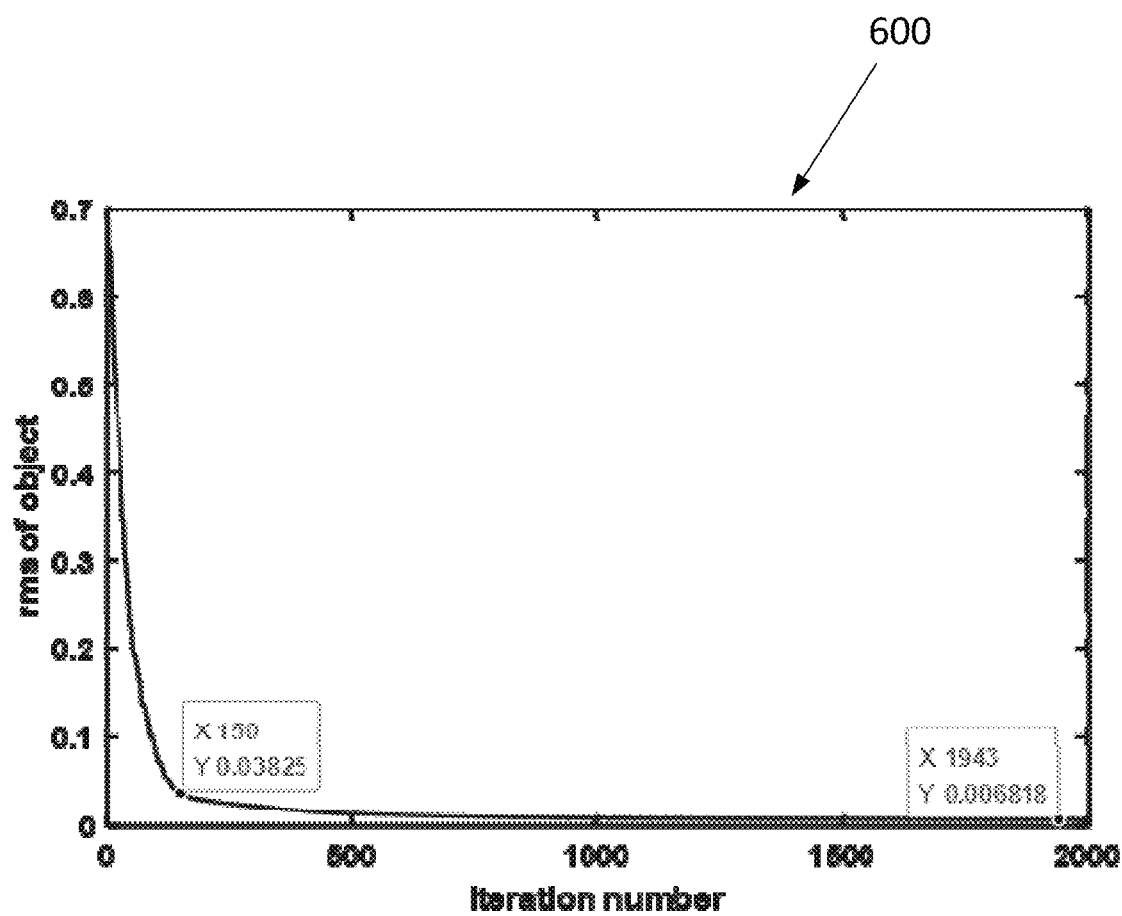
FIG. 6 shows convergence data illustrating convergence of the method 300.

FIG. 6 illustrates a graph 600 of convergence data showing the convergence of the object transmission function during characterisation of the object shown in the image data 500. The graph 600 displays on the y axis the rms between the estimated intensity of the detector wavefield and the known recorded diffraction pattern $I_n(r_D)$. It will be appreciated that this value is indicative of the accuracy of the estimated object transmission function and illumination wavefield. The graph 600 displays on the x axis the iteration number k. Rapid convergence of the estimated intensity at the detector wavefield against the known diffraction pattern can be seen, giving an rms of <0.05 at only 150 iterations.

The present invention thus provides a stand-alone coherent diffraction imaging technique for an unknown object. Importantly, overlapping measurements such as are required for ptychography are not necessary to characterise any portion of the process and so the technique may be used for unstable and fast moving sample dynamics.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for characterising at least a portion of an object, comprising the steps of:
   providing, via a support plane, coherent incident radiation at the object at each of a plurality of radiation configurations;
   detecting, at a detector, an intensity of radiation scattered by the object for each of the plurality of radiation configurations;
   determining, via an iterative process, an object transmission function associated with the object in dependence on the detected intensity of radiation at the detector for each of the plurality of radiation configurations, the iterative process comprising:
      estimating, for each of the plurality of radiation configurations, an entrance wave function indicative of the incident radiation at the object and an exit wave function indicative of radiation emitted from the object in dependence on the detected intensity at the detector, a support constraint at the support plane and a current estimate of the object transmission function;
      determining a ratio of a sum of intensities of the exit wave function for the plurality of radiation configurations to a sum of intensities of the entrance wave function for the plurality of radiation configurations; and
      updating the estimate of the object transmission function in dependence on the determined ratio and an amplitude constraint.

2. The method according to claim 1, wherein the amplitude constraint comprises a minimum amplitude limit and a maximum amplitude limit for the object transmission function.

3. The method according to claim 2, wherein each iteration of determining the ratio comprises:
   determining the sum of intensities of the entrance wave function as estimated in the current iteration; and
   determining the sum of intensities of the exit wave function as estimated in the previous iteration.

4. The method according to claim 2, wherein each iteration of determining the ratio comprises:
   determining the sum of intensities of the entrance wave function as estimated in the previous iteration; and
   determining the sum of intensities of the exit wave function as estimated in the current iteration.

5. The method according to claim 2, wherein the iterative process comprises:
   providing an initial estimate of the object transmission function;
   providing an initial estimate of a wave function associated with each radiation configuration at the support plane; and
   propagating the wave function to and fro between the support plane and the detector to obtain the estimate for the entrance wave function and the estimate for the exit wave function.

6. The method according to claim 2, wherein the amplitude constraint comprises the condition $|O| \in [0,1]$, wherein $|O|$ denotes the amplitude of the estimate of the object transmission function.

7. The method according to claim 6, wherein at each iteration n the ratio is determined in dependence on a parameter:

$$\frac{\sum_{j=1}^{N} E_{j,n-1} \cdot P_{j,n}^*}{\sum_{j=1}^{N} P_{j,n} \cdot P_{j,n}^*}$$

wherein $E_{j,n-1}$ denotes the exit wave function for radiation configuration j at iteration n−1, and $P_{j,n}$ denotes the entrance wave function for radiation configuration j at iteration n.

8. The method according to claim 6, wherein each iteration of determining the ratio comprises:
   determining the sum of intensities of the entrance wave function as estimated in the current iteration; and
   determining the sum of intensities of the exit wave function as estimated in the previous iteration.

9. The method according to claim 6, wherein each iteration of determining the ratio comprises:
   determining the sum of intensities of the entrance wave function as estimated in the previous iteration; and
   determining the sum of intensities of the exit wave function as estimated in the current iteration.

10. The method according to claim 1, wherein each iteration of determining the ratio comprises:
   determining the sum of intensities of the entrance wave function as estimated in the current iteration; and
   determining the sum of intensities of the exit wave function as estimated in the previous iteration.

11. The method according to claim 1, wherein each iteration of determining the ratio comprises:
determining the sum of intensities of the entrance wave function as estimated in the previous iteration; and
determining the sum of intensities of the exit wave function as estimated in the current iteration.

12. The method according to claim 11, wherein at each iteration n the ratio is determined in dependence on a parameter:

$$\frac{\sum_{j=1}^{N} E_{j,n} \cdot P_{j,n-1}^*}{\sum_{j=1}^{N} P_{j,n-1} \cdot P_{j,n-1}^*}$$

wherein $E_{j,n}$ denotes the exit wave function for radiation configuration j at iteration n, and $P_{j,n-1}$ denotes the entrance wave function for radiation configuration j at iteration n−1.

13. The method according to claim 1, wherein the iterative process comprises:
providing an initial estimate of the object transmission function;
providing an initial estimate of a wave function associated with each radiation configuration at the support plane; and
propagating the wave function to and fro between the support plane and the detector to obtain the estimate for the entrance wave function and the estimate for the exit wave function.

14. The method according to claim 1, wherein the plurality of radiation configurations comprise:
a plurality of tilt angles of the incident radiation; or
a plurality of rotation angles of a phase screen at the support plane.

15. The method according to claim 1, comprising terminating the iterative process in dependence on a convergence of the object transmission function between subsequent iterations.

16. The method according to claim 1, comprising determining image data indicative of the object in dependence on the object transmission function.

17. A non-transitory computer-readable medium comprising computer software which, when executed, is arranged to perform a method according to claim 1.

18. A method for characterising at least a portion of an object, comprising the steps of:
providing, via a support plane, coherent incident radiation at the object at each of a plurality of radiation configurations, wherein each radiation configuration comprises a predetermined tilt angle of the incident radiation;
detecting, at a detector, an intensity of radiation scattered by the object for each of the plurality of radiation configurations;
determining, via an iterative process, an object transmission function associated with the object in dependence on the detected intensity of radiation at the detector for each of the plurality of radiation configurations, the iterative process comprising:
estimating, for each of the plurality of radiation configurations, an entrance wave function indicative of the incident radiation at the object and an exit wave function indicative of radiation emitted from the object in dependence on the predetermined tilt angle for the radiation configuration, the detected intensity at the detector, a support constraint at the support plane and a current estimate of the object transmission function;
determining a ratio of a sum of intensities of the exit wave function for the plurality of radiation configurations to a sum of intensities of the entrance wave function for the plurality of radiation configurations; and
updating the estimate of the object transmission function in dependence on the determined ratio.

19. An apparatus for characterising an object, the apparatus comprising one or more electronic processors configured to operatively execute computer-readable instructions to:
control a radiation source to provide, via a support plane, coherent incident radiation at the object at each of a plurality of radiation configurations;
receive, from a detector, detection data indicative of an intensity of radiation scattered by the object for each of the plurality of radiation configurations;
determine, via an iterative process, an object transmission function associated with the object in dependence on the detected intensity of radiation at the detector for each of the plurality of radiation configurations, the iterative process comprising:
estimating, for each of the plurality of radiation configurations, an entrance wave function indicative of the incident radiation at the object and an exit wave function indicative of radiation emitted from the object in dependence on the detected intensity at the detector, a support constraint at the support plane and a current estimate of the object transmission function;
determining a ratio of a sum of intensities of the exit wave function for the plurality of radiation configurations to a sum of intensities of the entrance wave function for the plurality of radiation configurations; and
updating the estimate of the object transmission function in dependence on the determined ratio and an amplitude constraint.

20. The apparatus of claim 19, further comprising:
a radiation source configured to provide the coherent incident radiation; and
a detector configured to detect an intensity of radiation scattered by the object for each of the plurality of radiation configurations and output the detection data in dependence thereon.

* * * * *